Oct. 23, 1956  M. A. FAGET  2,767,579
FLIGHT MACH NUMBER INDICATOR
Filed Sept. 30, 1953
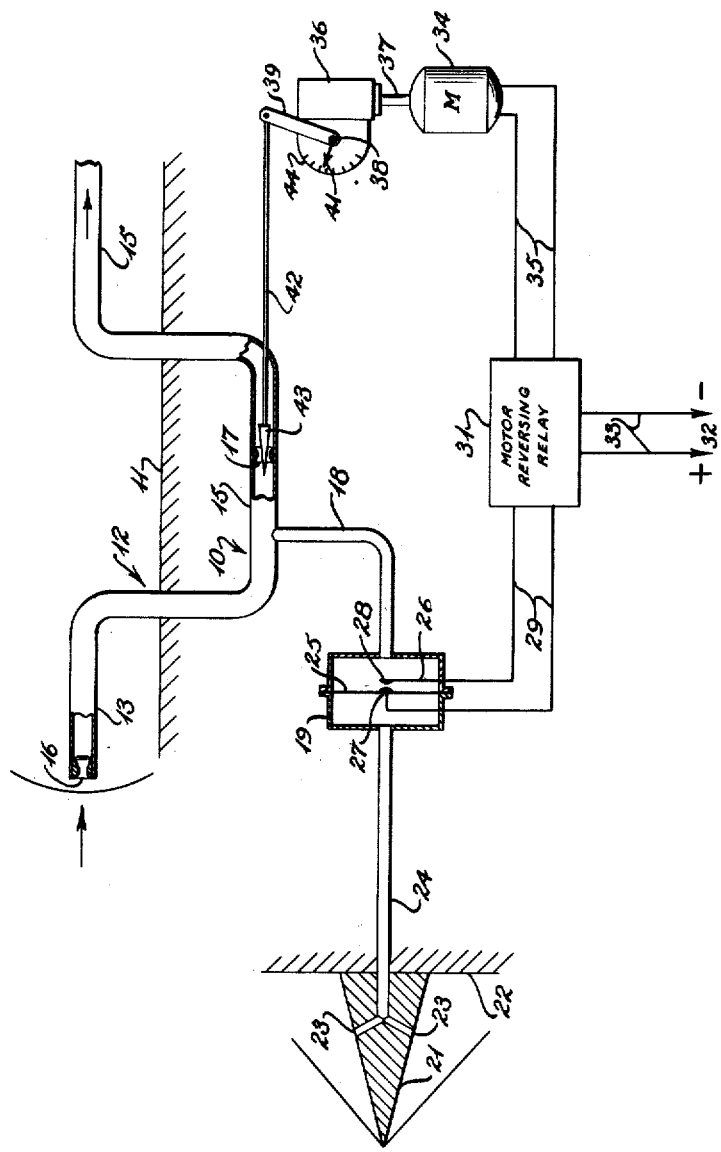
INVENTOR
*Maxime A. Faget*
BY
*J. F. Schmitt*
*Walter S. Paul*
ATTORNEYS 2,767,579
Patented Oct. 23, 1956

2,767,579
FLIGHT MACH NUMBER INDICATOR

Maxime A. Faget, Warwick, Va., assignor to the United States of America as represented by the Secretary of the Navy Application September 30, 1953, Serial No. 383,413

8 Claims. (Cl. 73—182)

(Granted under Title 35, U. S. Code (1952), sec. 266)

The invention described herein may be manufactured and used by or for the Government of the United States of America for governmental purposes without the payment of any royalties thereon or therefor.

The present invention relates to a flight Mach number indicator and more particularly to a high gain Mach number indicator which computes Mach number by determining the ratio between the free-stream impact pressure and the free-stream static pressure.

Heretofore, the Mach number indicators of the prior art have utilized mechanical or electronic devices to compute the pressure ratio and have required a means of amplification before they would produce a signal strong enough to be integrated into the control system of a missile or an aircraft.

In the present invention, the ratio between the two pressures is determined by aerodynamically reducing the free-stream impact pressure until it can be balanced against the free-stream static pressure. The reduction of the larger pressure is performed by a system of two choking orifices through which the high-pressure air is bled in such a manner that the ratio of the reduced pressure to the original pressure is accurately determinable.

An object of the present invention is the provision of a Mach number indicator which utilizes air flow to accomplish the computation of pressure ratio.

Another object is to provide an extremely sensitive, high gain Mach number indicator suitable for use at altitudes up to 100,000 feet.

A further object of this invention is the provision of a Mach number indicator which be made to produce large motivating forces for the operation of cams and linkages in control systems where a Mach number sense is required.

Other objects and many of the attendant advantages of this invention will be readily appreciated as the same becomes better understood by reference to the following detailed description when considered in connection with the accompanying sheet of drawing wherein the figure is a diagrammatic plan view, partly in section, of a preferred embodiment of the invention.

Referring more particularly to the drawing, a pressure divider 10 is mounted in wall 11 of a missile or an aircraft such that it protrudes into the free air stream. In the embodiment illustrated, pressure divider 10 comprises a tube 12 having straight upstream and downstream end sections 13 and 14 respectively and an offset center portion 15. Positioned in the open end of the upstream portion 13 is an intake orifice 16 for the introduction of air under impact pressure into the tube 12. An adjustable orifice 17 divides the air under impact pressure allowing a portion thereof to exhaust through end section 14, the remainder thereof being shunted into conduit 18 which connects the tube 12 with the impact pressure side of a diaphragm cell 19.

As illustrated, a 15° cone 21 is mounted on wall 22 in contact with the free air stream, such that openings 23 serve as intakes for air under static pressure, which is then delivered to the static pressure side of cell 19 through conduit 24. The static pressure and the divided impact pressure delivered to cell 19 act on opposite sides of diaphragm 25 causing it to move in response to variations between the two pressures. A zero-differential pressure switch 26 is positioned in cell 19 with the movable contact 27 thereof carried by the diaphragm 25 and the fixed contact 28 thereof mounted in one side of the cell. Leads 29 connect switch 26 with a motor reversing relay 31 which is further connected to a power source 32 by leads 33 and to a reversible motor 34 by leads 35. Motor 34, in the hook-up shown, drives continuously and is continually reversed by relay 31, which through switch 26, acts in response to movements of diaphragm 25 caused by pressure differentials in cell 19.

A gear box 36, driven by motor 34 by means of input shaft 37, has an output shaft 38 drivingly connected to a crank arm 39 and a pointer 41, the crank arm 39 being pivotally connected to link 42 which is in turn connected to the movable plug 43 of the adjustable orifice 17, and the pointer 41 cooperating with a scale 44 calibrated in Mach numbers. Thus, when motor 34 is reversed in response to a pressure differential in cell 19, the movements of crank arm 39 and pointer 41 are likewise reversed; the reversal of the crank arm and consequently link 42 and plug 43 serving to adjust orifice 17 to balance the pressures in cell 19, and the reversed movement of pointer 41, in cooperation with scale 44, measuring the adjustment and giving a new Mach number indication.

In the operation of the described Mach number indicator, the divided impact pressure from the pressure divider is balanced against the cone surface pressure from the 15° cone and the variable orifice area is adjusted by the reversible motor to main this balance. The divided impact pressure is thus always equal to the cone surface pressure, and since only one ratio of impact pressure to divided pressure will exist for a given variable orifice area the pressure ratio will be approximately equal to the ratio of the areas of the two orifices. Therefore, the area of the adjustable orifice is an indication of the pressure ratio and the position of the adjusting linkage can be calibrated in Mach number.

Successful operation of this device requires that both the intake orifice and the adjustable orifice choke. The pressure ratio across the intake orifice will be such that choking will occur at all Mach numbers above approximately 0.5, while the adjustable orifice can be made to choke readily provided it exhausts into a low enough pressure region. In the case of a low Mach number range instrument, a small pump or aspirator may be used to provide a low enough exhaust pressure region, but in the case of an instrument for use at higher Mach numbers, exhausting to base pressure in the wake of the aircraft or missile will be sufficient. The instrument set up for the latter case is illustrated in the drawing. The use of a 15° cone simplifies construction in this case since the static pressure on the surface of the cone results in a nearly linear variation of pressure ratio versus Mach number at supersonic speeds. However, at transonic and subsonic speeds the use of free-stream static pressure rather than cone surface pressure produces a much more uniform variation of pressure ratio with Mach number. Consequently, it is contemplated that at transonic and subsonic speeds an instrument such as a Pitot tube or its equivalent may be substituted for the cone of Fig. 1.

This Mach number indicator can be used to give remote visual measurements of Mach number, or with both orifices of constant area the device can be used to determine whether flight Mach number is above or below a desired value, in addition, this indicator is well adapted for use in control systems where a Mach number sense is desired. As an example, the cowl position of an inlet may be varied with Mach number to give ideal geometry at various speeds. The mechanism for this may be directly driven by this device providing a large enough motor is used. If the desired motion is not a linear variation with Mach number, this could be compensated for by properly shaping the movable plug in the adjustable orifice of the pressure divider.

Obviously many modifications and variations of the present invention are possible in the light of the above teachings. It is therefore to be understood that within the scope of the appended claims the invention may be practiced otherwise than as specifically described.

What is claimed is:

1. A flight Mach number indicating device comprising an impact pressure receiving orifice, and an adjustable area orifice conected thereto by a tube; a diaphragm cell, one side of which is connected to said tube; a free-stream static pressure sensing means connected to the other side of said diaphragm cell; a driving means operatively connected to a diaphragm in said cell; and a control attached to said adjustable area orifice and connected to said driving means, whereby said control means is operated by said driving means in response to movements of said diaphragm to adjust said adjustable area orifice and maintain the pressures in said cell in balance, the movements of said control means serving as an indication of the Mach number.

2. A flight Mach number indicator comprising a free-stream impact pressure sensing means with an adjustable area orifice connected thereto by a tube; a diaphragm cell, one side of which is connected to said tube; a free-stream static pressure sensing means connected to the other side of said diaphragm cell; and control means attached to said adjustable area orifice and operatively connected to a diaphragm in said cell, whereby movement of said diaphragm activates said control to adjust said adjustable area orifice thus maintaining the pressures in said cell in balance, the position of said control serving as a visual indication of Mach number.

3. The Mach number indicator of claim 2 in which the static-pressure sensing means is a cone having an apex angle of 150° with openings on oposite sides thereof connected to the other side of said diaphragm cell.

4. A flight Mach number indicator comprising a free-stream impact-pressure sensing means having an impact pressure intake orifice, and a tube connecting said orifice with an adjustable area orifice; a diaphragm cell, one side of which is connected to the tube of said impact pressure sensing means; a free-stream static pressure sensing means connected to the other side of said diaphragm cell; and a control attached to said adjustable orifice and operatively connected to a diaphragm in said cell, whereby movement of said diaphragm activates the control to cause a compensating adjustment in the adjustable orifice thus maintaining the pressures in said cell in balance, the position of said control serving as a visual indication of Mach number.

5. A flight Mach number indicator comprising a free-stream impact pressure sensor and divider including two choking orifices connected by a tube, one of said orifices being adjustable in area and the other receiving impact pressure; a free-stream static pressure sensor; a pressure balancing means connected to said pressure divider tube and to said static pressure sensor which balances divided impact pressure against static pressure, said means including a movable part activated by static-divided impact pressure differentials; a control attached to said adjustable orifice and operatively connected to said movable part, whereby movement of said part activates the control to cause a compensating adjustment in the adjustable orifice thus maintaining the pressures in said balancing means in balance, the position of said control serving as a visual indication of Mach number.

6. A flight Mach number indicator comprising a free-stream impact pressure sensor with an adjustable area orifice connected thereto; a free-stream static pressure sensor; a pressure balancing means having each side thereof connected to one of said sensors to balance divided impact pressure against static pressure, said balancing means including a movable part activated by a difference in said static and divided pressures; a control attached to said adjustable orifice and operatively connected to said movable part, whereby movement of said part activates the control to cause a compensating adjustment in the adjustable orifice thus maintaining the pressures in the said balancing means in balance, the position of said control serving as a visual indication of Mach number.

7. A Mach number indicator comprising a cell, a pressure responsive element in said cell, means connected with said cell applying static pressure to one side of said element, means for sensing impact pressure, an adjustable orifice connected by a tube to the last-mentioned means for dividing impact pressure, a conductor for the divided impact pressure connected to said cell and said tube for applying the divided pressure to the opposite side of said element, so that divided impact and static pressures are balanced against each other in said cell, a Mach number scale, a pointer on the scale, and means for moving said pointer connected to said pressure responsive element and responsive to pressure unbalance on the sides thereof to adjust said adjustable orifice until the pressure unbalance on the sides of said element is removed.

8. In a Mach number indicator, a cell containing an element that separates the cell into a pair of expansible chambers, means for applying static pressure to one chamber, an impact pressure divider including an impact pressure sensor connected by a tube to an adjustable orifice, means connected with said tube for applying divided impact pressure to the other chamber, means to adjust said orifice, and means responsive to pressure differential between said chambers for actuating said adjusting means.

References Cited in the file of this patent

UNITED STATES PATENTS

| | | |
|---|---|---|
| 2,092,019 | Randel | Sept. 7, 1937 |
| 2,116,550 | Adelson | May 10, 1938 |
| 2,592,176 | Arlin et al. | Apr. 8, 1952 |
| 2,675,020 | Bretwieser | Apr. 13, 1954 |

U. S. DEPARTMENT OF COMMERCE
PATENT OFFICE

CERTIFICATE OF CORRECTION

Patent No. 2,767,579                                                  October 23, 1956

Maxime A. Faget

It is hereby certified that error appears in the printed specification of the above numbered patent requiring correction and that the said Letters Patent should read as corrected below.

Column 1, line 45, after "which" insert -- may --; column 2, line 34, strike out "main" and insert -- maintain --; column 3, line 43, strike out "150°" and insert instead -- 15° --.

Signed and sealed this 8th day of April 1958.

(SEAL)
Attest:

KARL H. AXLINE
Attesting Officer

ROBERT C. WATSON
Commissioner of Patents